United States Patent
Majkowska

(10) Patent No.: US 9,336,301 B2
(45) Date of Patent: *May 10, 2016

(54) MERGING SEMANTICALLY SIMILAR CLUSTERS BASED ON CLUSTER LABELS

(71) Applicant: Google Inc., Mountain View, CA (US)

(72) Inventor: Anna Dagna Majkowska, San Francisco, CA (US)

(73) Assignee: Google Inc., Mountain View, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/075,371

(22) Filed: Nov. 8, 2013

(65) Prior Publication Data

US 2015/0161248 A1   Jun. 11, 2015

Related U.S. Application Data

(63) Continuation of application No. 13/251,057, filed on Sep. 30, 2011, now Pat. No. 8,583,648.

(51) Int. Cl.
*G06F 7/00* (2006.01)
*G06F 17/30* (2006.01)

(52) U.S. Cl.
CPC .... *G06F 17/30705* (2013.01); *G06F 17/30011* (2013.01); *G06F 17/3071* (2013.01)

(58) Field of Classification Search
CPC ............... G06F 17/30705; G06F 17/30011
USPC ........................................................ 707/737
See application file for complete search history.

(56) References Cited

U.S. PATENT DOCUMENTS

| | | | |
|---|---|---|---|
| 6,578,032 B1 | 6/2003 | Chandrasekar et al. | |
| 8,161,028 B2 * | 4/2012 | Hu et al. | 707/706 |
| 8,543,576 B1 * | 9/2013 | Buryak et al. | 707/737 |
| 8,583,648 B1 | 11/2013 | Majkowska | |
| 8,713,017 B2 * | 4/2014 | Lu et al. | 707/737 |
| 9,002,848 B1 * | 4/2015 | Peng et al. | 707/737 |
| 2002/0165873 A1 | 11/2002 | Kwok et al. | |
| 2006/0248053 A1 * | 11/2006 | Sanfilippo | G06F 17/3071 |
| 2007/0150802 A1 * | 6/2007 | Wan | G06F 17/241 715/205 |
| 2008/0082531 A1 | 4/2008 | Suarez | |
| 2009/0327320 A1 | 12/2009 | Yan et al. | |
| 2012/0198342 A1 | 8/2012 | Mahmud | |
| 2012/0209853 A1 | 8/2012 | Desai et al. | |

* cited by examiner

*Primary Examiner* — Cheyne D Ly
(74) *Attorney, Agent, or Firm* — Dority & Manning, P.A.

(57) ABSTRACT

A server device may receive first label information regarding a first cluster that includes information identifying a first set of documents, where the first label information regarding the first cluster includes a first set of labels that are associated with the first cluster, and second label information regarding a second cluster that includes information identifying a second set of documents, where the second label information regarding the second cluster includes a second set of labels that are associated with the second cluster, where the second set of documents is different from the first set of documents. The server device may determine that the first and second clusters are semantically similar, which may include determining whether a similarity of the first and second clusters is above a similarity threshold.

20 Claims, 6 Drawing Sheets

US 9,336,301 B2

MERGING SEMANTICALLY SIMILAR CLUSTERS BASED ON CLUSTER LABELS

RELATED APPLICATION

This application is a continuation of U.S. patent application Ser. No. 13/251,057, filed Sep. 30, 2011, now U.S. Pat. No. 8,583,648, the disclosure of which is hereby incorporated herein by reference.

BACKGROUND

Many techniques are available to users today to find information on the World Wide Web ("web"). For example, users often use web browsers and/or search engines to find information of interest. In order to provide quality results to users, search engines often cluster information regarding search result documents, such as web pages or images, together. Different clusters may often be semantically similar, but include similar sets of documents. For example, a cluster that is labeled "Ford car" may include some or all of the same documents as another cluster that is labeled "Ford automobile." Such duplicative clustering may be inefficient when a search engine processes these clusters. Additionally, a search engine may erroneously present both of these similar clusters in response to a search query, and represent them as corresponding to different topics.

SUMMARY

According to an implementation, a method may include receiving first label information regarding a first cluster that includes information identifying a first set of documents. The first label information regarding the first cluster may include a first set of labels that are associated with the first cluster. The method may further include receiving second label information regarding a second cluster that includes information identifying a second set of documents. The second label information regarding the second cluster may include a second set of labels that are associated with the second cluster. The second set of documents may be different from the first set of documents. Additionally, the method may include determining that the first and second clusters are semantically similar. This determination may include determining whether a similarity of the first and second clusters is above a similarity threshold. The method may further include forming a merged cluster by merging the first and second clusters. The method may also include determining one or more labels for the merged cluster. Further still, the method may include assigning the one or more labels to the merged cluster.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

Search engines often employ document clustering for several purposes. For example, similar documents, such as web pages, images, videos, news articles, product information, etc., may be clustered according to topics. Thus, a "cluster," as referred to herein, may include information regarding a group of documents that have been identified as topically similar. Each cluster may be associated with one or more labels that serve to identify the topic(s) associated with the cluster. When a user provides a search query to a search engine, the search engine may use cluster information when returning search results to the user.

For instance, if a user enters a search query, "Lotus," the search engine may identify multiple clusters that are associated with the search query. One such cluster may relate to Lotus brand automobiles, while another such cluster may relate to lotus flowers. When returning search results, the search engine may distinctly identify, for the user, which search results correspond to the automobile and which search results correspond to the flower.

Figure 1:
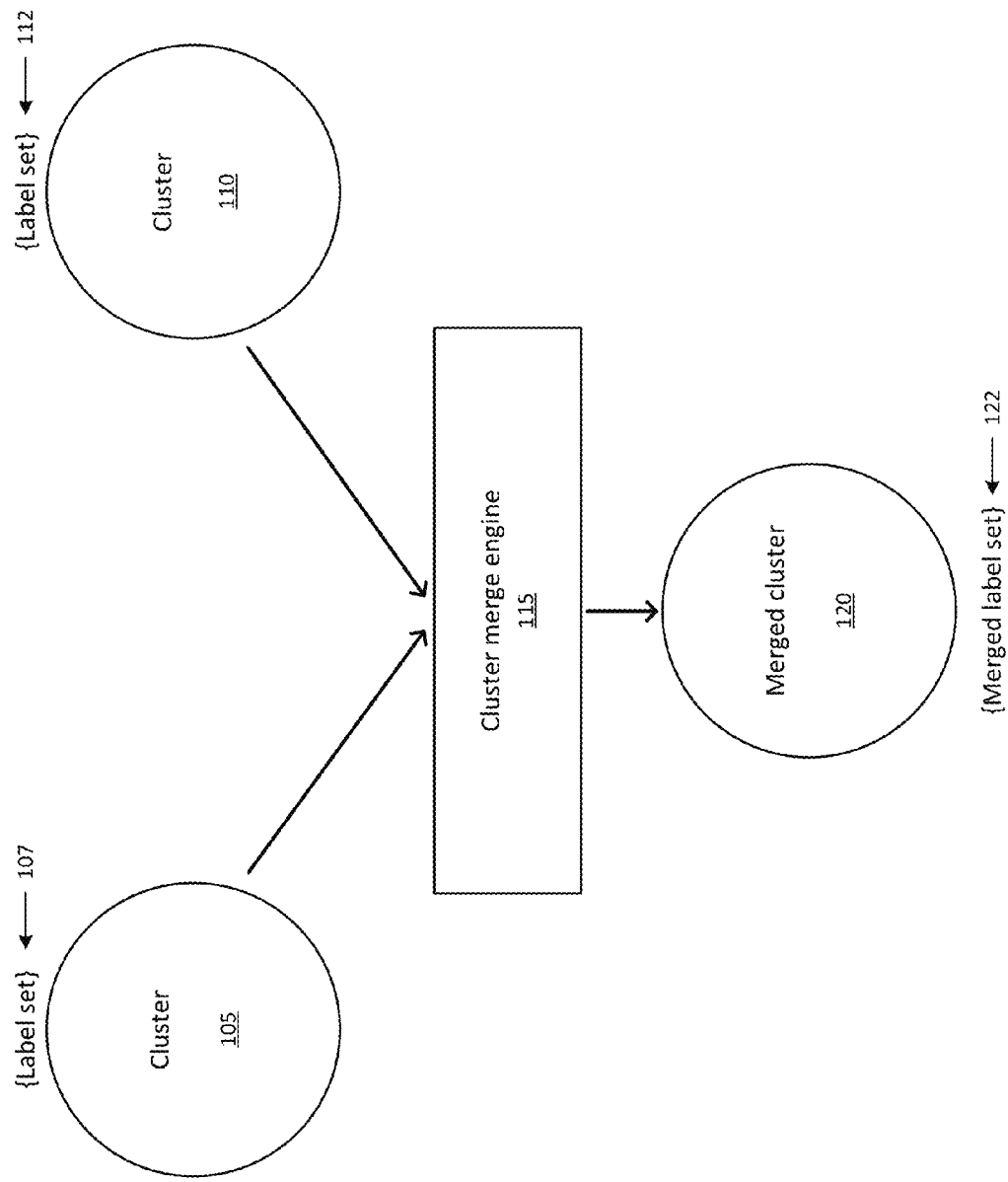
FIG. 1 is a diagram illustrating an overview of an example implementation described herein.

A system and/or method, described herein, may enable a search engine to identify clusters that are semantically similar, combine the similar clusters, and label the clusters with an appropriate label. For example, as illustrated in FIG. 1, two clusters 105 and 110 may be identified, e.g., may be received from a cluster repository (not pictured). Cluster 105 may be associated with a set of labels 107, while cluster 110 may be associated with another set of labels 112. A cluster merge engine 115 may receive the clusters 105 and 110, along with their corresponding sets of labels 107 and 112, also referred to as "label sets 107 and 112," and generate a merged cluster 120. Merged cluster 120 may be associated with its own set of labels 122.

For example, cluster 105 may include information identifying a first set of documents, e.g., images of Lotus automobiles. The set of labels 107, associated with cluster 105, may include the labels "Lotus," "Lotus cars," "Red Lotus cars," and "Blue Lotus cars." Cluster 110 may include information identifying a second set of documents, e.g., images of blue Lotus automobiles. The set of labels 112, associated with cluster 110, may include the labels "Lotus," "Lotus cars," and "Blue lotus cars." Cluster merge engine 115 may identify that clusters 105 and 110 are similar, e.g., based on analyzing label sets 107 and 112, and merge clusters 105 and 110 to form merged cluster 120 and corresponding label set 122.

Merged cluster 120 may include some or all of the images included in cluster 105, and some or all of the images included in cluster 110. The set of labels 122 may also include some or all of the labels included in label sets 107 and 112. For example, the set of labels 122 may include the labels "Lotus," and "Lotus cars." In one implementation, label set 122 may omit some or all of the labels included in label sets 107 and 112. In the example above, label set 122 does not include the label "Red Lotus Cars," as included in label set 107, and label set 122 does not include the label "Blue Lotus Cars," as included in label sets 107 and 112. In other examples, label set 122 may include fewer, additional or different labels, e.g., all of the labels included in label sets 107 and 112.

The concepts described herein may be applied to sets of documents. In one implementation, the documents may be images, such as images indexed by an image search engine. More generally, a document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as Javascript, etc. A "link," as the term is used herein, is to be broadly interpreted to include any reference to/from a document from/to another document or another part of the same document.

Example Environment

Figure 2:
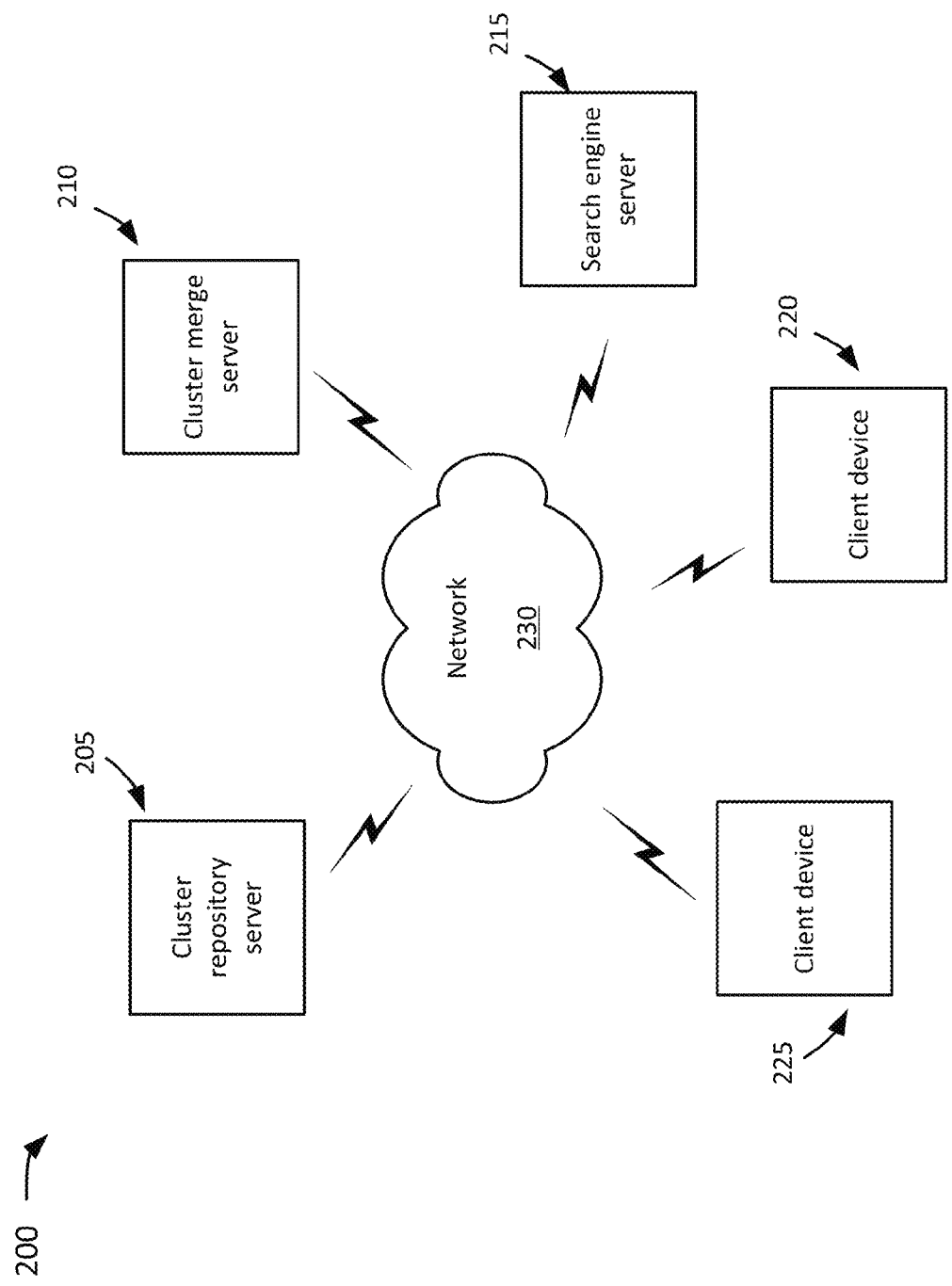
FIG. 2 is a diagram of an example environment in which systems and/or methods described herein may be implemented.

FIG. 2 is a diagram of an example environment 200 in which systems and/or methods described herein may be implemented. Environment 200 may include multiple servers 205-215 connected to each other, and to multiple clients 220-225 via a network 230. Three servers 205-215 and two clients 220-225 have been illustrated as connected to network 230 for simplicity. In practice, there may be additional or fewer clients and servers. Also, in some instances, a client may perform a function of a server, and a server may perform a function of a client.

Each server 205-215 may be implemented as a single server device or a collection of server devices that may be co-located or remotely located. Additionally, or alternatively, any two or more of servers 205-215 may be implemented within a single, common server device or a single, common collection of server devices.

Servers 205-215 may include server devices that gather, process, search, and/or implement functions in a manner described herein. One or more of servers 205-215 may perform functions described with respect to one or more components described with respect to FIG. 1. For example, server 205 may store information regarding clusters, such as one or more of clusters 105, 110, or 120, and/or any other cluster, and server 210 may implement functionality described with respect to cluster merge engine 115.

Server 215 may implement a search engine that receives search queries, e.g., from client devices 220-225. Server 215 may interact with the one or more of servers 205-210 in order to determine search results, including clusters of search results, that are responsive to search queries. Server 215 may provide a search result document to a client, e.g., client device 220/225, from which the search query was received. The search result document, provided by server 215, may include information identifying clusters of search results. The search result document may further include information regarding one or more other web pages that were identified as responsive to the search query.

Each of clients 220-225 may include a client device, such as personal computer, a wireless telephone, a personal digital assistant ("PDA"), a laptop, or another type of computation or communication device. Clients 220-225 may include user interfaces presented through one or more browsers, e.g., web browsers, such as Chrome.

Additional servers, implementing other functions, although not explicitly shown, may also be implemented in environment 200. The additional servers may provide, for example, web content, payment services, shopping services, social networking services, etc.

While servers 205-215 are shown as separate components, it may be possible for one or more of servers 205-215 to perform one or more of the functions of another one or more of servers 205-215. For example, in one implementation, server 215 may perform the functions of server 210. Additionally, or alternatively, server 215 may perform the functions of server 205.

Network 230 may include any type of network, such as a local area network ("LAN"), a wide area network ("WAN"), a telephone network, e.g., the Public Switched Telephone Network ("PSTN") or a cellular network, an intranet, the Internet, or a combination of networks. Servers 205-215 and clients 220-225 may connect to network 230 via wired and/or wireless connections. In other words, any one of servers 205-215 or clients 220-225 may connect to network 230 via a wired connection, a wireless connection, or a combination of a wired connection and a wireless connection.

Example Client/Server Components

Figure 3:
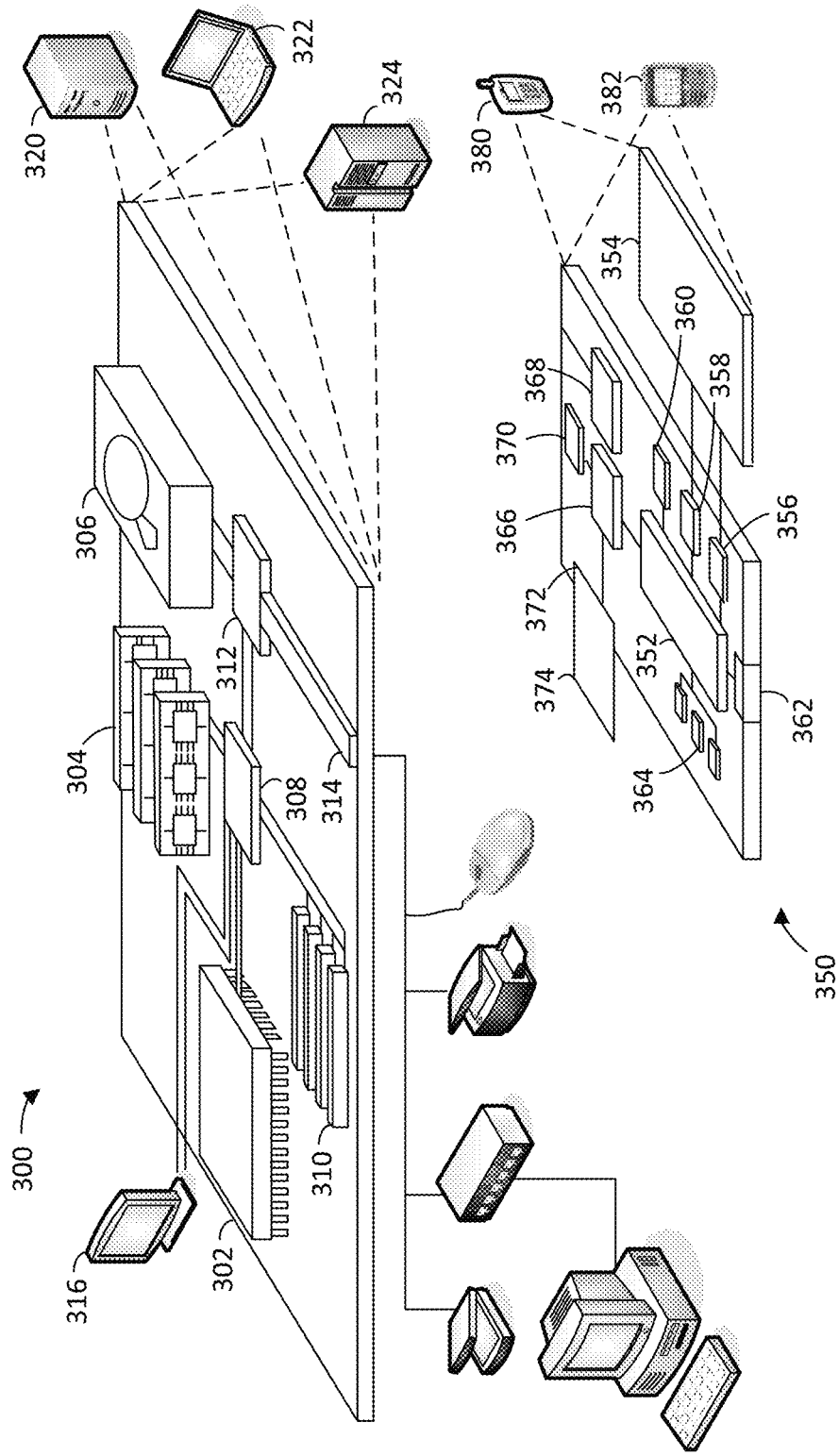
FIG. 3 shows an example of a generic computer device and a generic mobile computer device.

FIG. 3 shows an example of a generic computing device 300 and a generic mobile computing device 350, which may be used with the techniques described here. Generic computing device 300 and generic mobile computing device 350 may correspond to, for example, a client 220/225 and/or a server 205, 210, or 215.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations of the inventions described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In one implementation, memory 304 includes a volatile memory unit or units. In another implementation, memory 304 includes a non-volatile memory unit or units.

The memory 304 may also be another form of computer-readable medium, such as a magnetic or optical disk.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In one implementation, high-speed controller 308 is coupled to memory 304, display 316, e.g., through a graphics processor or accelerator, and to high-speed expansion ports 310, which may accept various expansion cards (not shown). In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and/or "computer-readable medium" refers to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

Example Process for Merging Clusters

Figure 4:
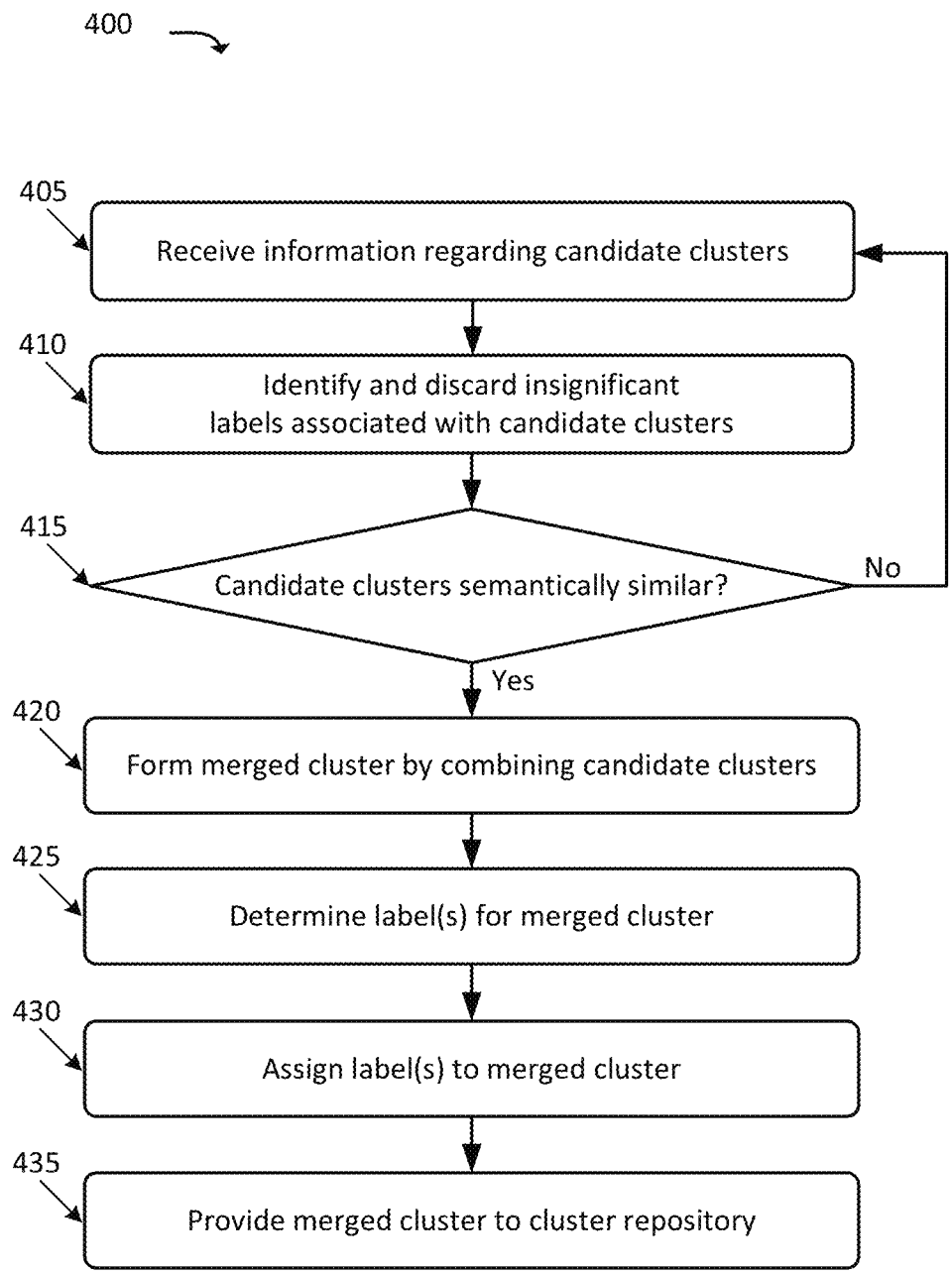
FIG. 4 illustrates a flowchart of an example process for merging clusters of documents.

FIG. 4 illustrates a flowchart of an example process 400 for merging clusters of documents. In one implementation, process 400 may be performed by cluster merge server 210. In another implementation, process 400 may be performed by one or more other components instead of, or possibly in conjunction with, cluster merge server 210. For example, some or all of process 400 may be performed by server 215.

As shown in FIG. 4, process 400 may include receiving information regarding candidate clusters (block 405). For example, cluster merge server 210 may receive information regarding two or more candidate clusters from cluster repository server 205. The information regarding each of the candidate clusters may include information identifying one or more documents, e.g., web pages, images, videos, news articles, product information, etc., that are associated with the candidate cluster. The received information regarding the candidate clusters may further identify a quantity of documents associated with each of the candidate clusters.

The received information regarding the candidate clusters may also identify one or more labels that are associated with each of the candidate clusters. Each label, for a particular candidate cluster, may further be associated with a confidence score. The confidence score may indicate how relevant the label is to the cluster. Two of the candidate clusters may be associated with the same label, but the label may be associated with a different confidence score for each cluster. For example, a particular label may be associated with a confidence score of 0.9 with respect to a first candidate cluster, and the particular label may be associated with a confidence score of 0.7 with respect to a second candidate cluster. In other examples, the same label may have the same confidence score with respect to each of the candidate clusters.

Process 400 may further include identifying and discarding insignificant labels associated with the candidate clusters (block 40). For example, cluster merge server 210 may analyze the labels, associated with the received candidate clusters, in order to identify and discard insignificant labels. When identifying insignificant labels, cluster merge server 210 may determine which of the labels include misspelled words. Additionally, or alternatively, when identifying insignificant labels, cluster merge server 210 may determine which of the labels include words in a filtered list of words, e.g., words associated with adult content, offensive words, etc. Additionally, or alternatively, when identifying insignificant labels, cluster merge server 210 may determine which of the labels are associated with a confidence score that is below a threshold confidence score. Cluster merge server 210 may further use any other methodology for determining which labels are insignificant. Upon identifying the insignificant labels, cluster merge server 210 may discard the insignificant labels, e.g., ignore the insignificant labels in subsequent processing.

Figure 5:
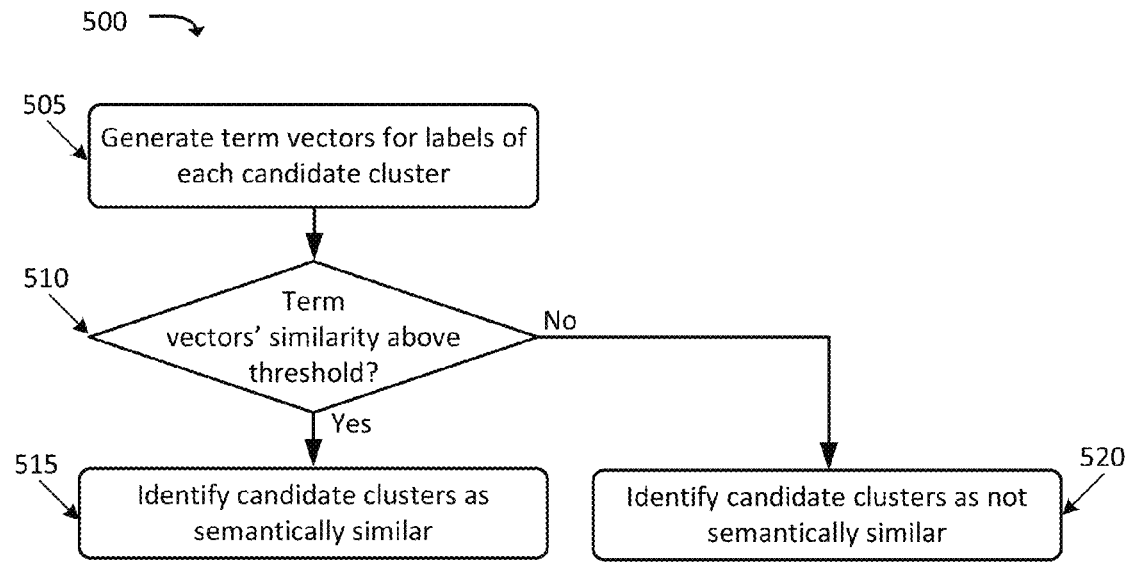
FIGS. 5 and 6 illustrate flowcharts of example processes for identifying semantically similar clusters.
Figure 6:
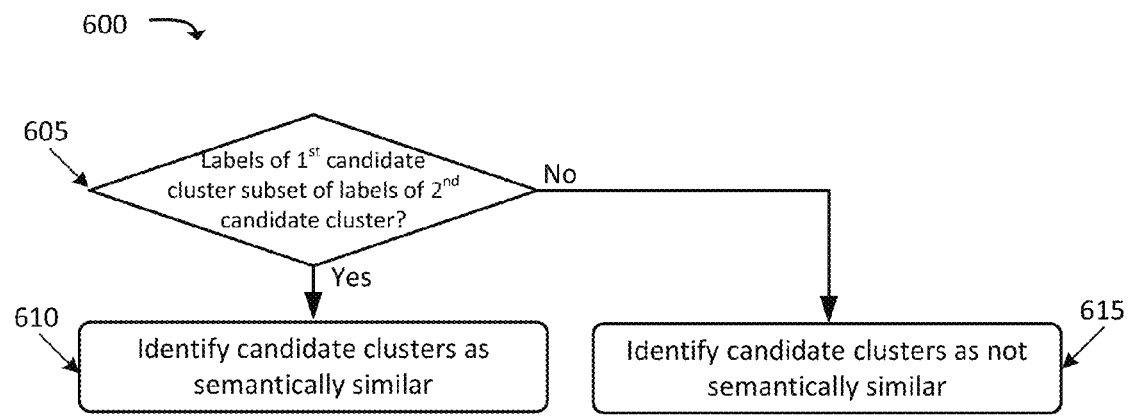

Process 400 may further include determining whether the candidate clusters are semantically similar (block 415). For example, cluster merge server 210 may determine whether the candidate clusters are semantically similar. FIGS. 5 and 6, described below, illustrate flowcharts of example processes by which cluster merge server 210 may perform this determination. If the candidate clusters are not semantically similar (block 415—NO), cluster merge server 210 may receive and evaluate another set of candidate clusters.

If the candidate clusters are semantically similar (block 415—YES), process 400 may further include forming a new cluster by combining the candidate clusters (block 420). For example, cluster merge server 210 may form a new cluster that includes information regarding one or more documents from one candidate cluster, and information regarding one or more documents from another candidate cluster. In some examples, the new cluster may include all of the documents from one candidate cluster, and/or all of the documents from another candidate cluster.

Additionally, or alternatively, cluster merge server 210 may identify duplicate documents that appear in multiple candidate clusters. In such a scenario, cluster merge server 210 may avoid placing duplicate information regarding such documents into the merged cluster, e.g., cluster merge server 210 may place information regarding such a duplicate document into the merged cluster only once, instead of placing the information regarding the duplicated document into the merged cluster two or more times.

Figure 7:
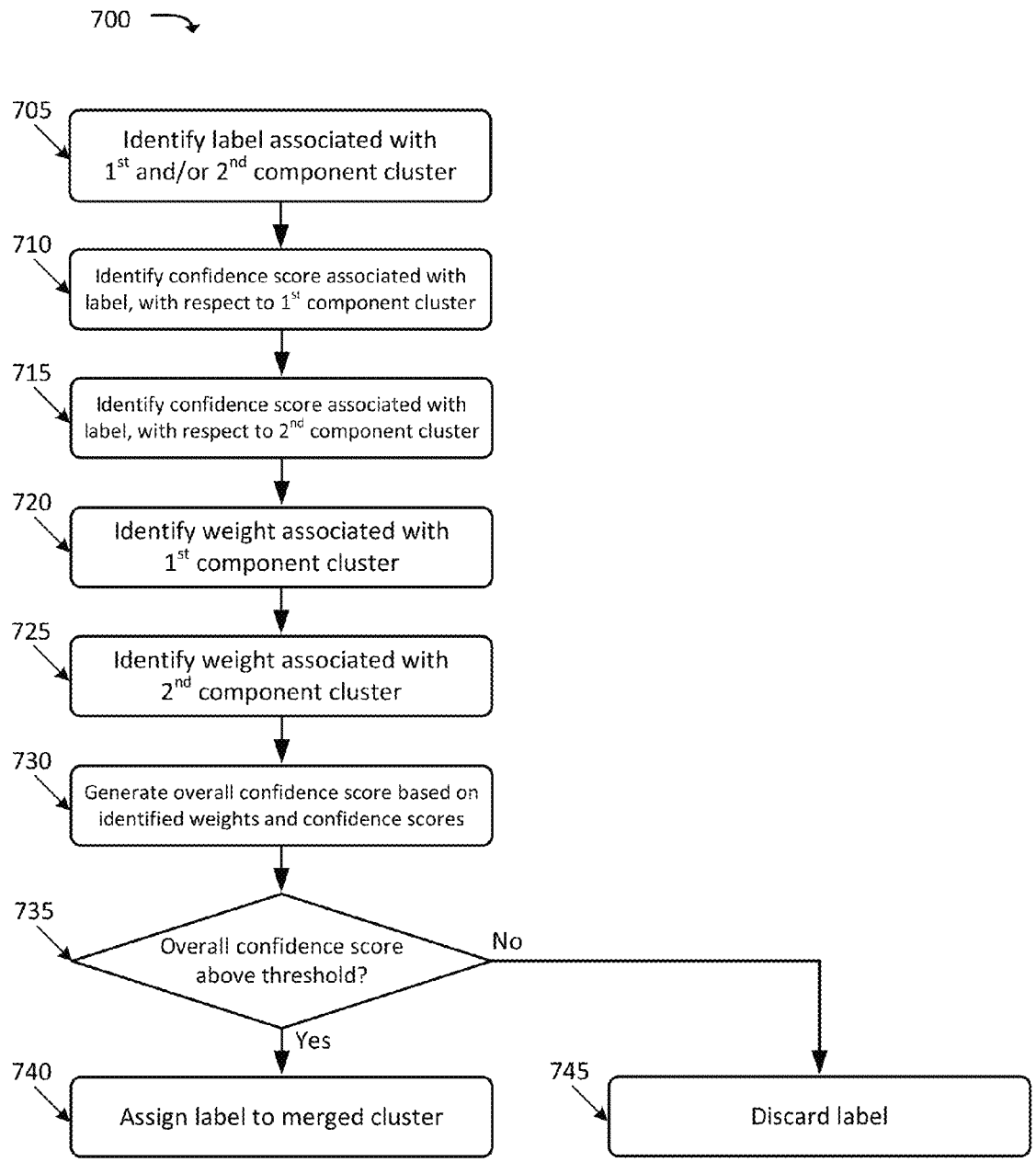
FIG. 7 illustrates a flowchart of an example process for assigning a label to a cluster.

Process 400 may further include determining a label, or labels, for the merged cluster (block 425). For example, cluster merge server 210 may examine the labels of the candidate clusters to determine the label(s) for the merged cluster. FIG. 7, described below, illustrates a flowchart of an example process by which cluster merge server 210 may perform this determination.

Process 400 may further include assigning the label, or labels, to the merged cluster (block 430), and providing the merged cluster to a cluster repository (block 435). For example, cluster merge server 210 may provide the merged cluster, along with the assigned label(s) to cluster repository server 205. When providing the merged cluster to cluster repository server 205, cluster merge server 210 may further indicate the candidate clusters that were combined to form the merged cluster. Cluster repository server 205, upon receiving the merged cluster, may store the merged cluster. Additionally, cluster repository server 205 may delete information regarding the candidate clusters when storing the merged cluster.

A search engine, e.g., search engine server 215, may subsequently use the merged cluster in an indexing and/or search operation. For example, if search engine 215 receives a search query, search engine 215 may identify that the merged cluster is relevant to the search query, and provide search results, such as one or more documents associated with the merged cluster.

Additionally, or alternatively, search engine server 215 may use the merged cluster in a directory listing. For example, a directory, e.g., an index, may include information identifying multiple documents. The documents in the directory may be grouped according to clusters. Thus, documents associated with, for example, the merged cluster, may be listed separately from documents associated with one or more other clusters.

Additionally, or alternatively, search engine server 215 may use the merged cluster to generate a summary of the merged cluster. For example, search engine server 215 may analyze documents within the cluster to extract important terms, e.g., terms that appear more frequently than other terms, terms that appear in certain locations of documents, etc. Search engine server 215 may generate a summary document that describes the merged cluster based on these extracted terms.

Additionally, or alternatively, search engine server 215 may use the merged cluster for efficient indexing. For example, when indexing documents, search engine server 215 may select only a particular quantity and/or percentage of the documents in the merged cluster to index. Search engine server 215 may further forego indexing other documents in the merged cluster.

While process 400 was described as including the above-mentioned blocks 405-435, some or all of these blocks may be considered optional. For example, in one implementation, block 410 may be omitted, e.g., insignificant labels may not be discarded. Additionally, or alternatively, block 425 may be omitted, e.g., cluster merge server 210 may not determine labels for a merged cluster. In such an example, cluster merge server 210 may provide the cluster to an external cluster labeling server (not pictured), which may provide the label(s), for the merged cluster, to cluster merge server 210.

Example Processes for Identifying Whether Clusters are Similar

FIG. 5 illustrates a flowchart of an example process 500 for identifying semantically similar clusters. Process 500, of FIG. 5, may be performed by cluster merge server 210. In another implementation, process 500 may be performed by one or more other components instead of, or possibly in conjunction with, cluster merge server 210. For example, some or all of process 500 may be performed by server 215.

As discussed above, block 425 of process 400 may include a portion of, or the entirety of, process 500. Process 500 may include generating term vectors for labels of each candidate cluster (block 505). For example, cluster merge server 210 may generate, for a particular candidate cluster, a term vector that includes information regarding each label, e.g., a label identifier, the label itself, an abbreviation of the label, etc., associated with the candidate cluster. The term vector may include a data structure, e.g., a linked list, a tree, a hash table, or any other data structure, that includes the labels. In one implementation, the labels included in the term vector may exclude labels identified as insignificant, e.g., labels identified as insignificant at block 410. In another implementation, labels included in the term vector may include all identified labels associated with a particular cluster.

Process 500 may include determining whether the similarity of the candidate clusters' term vectors is above a threshold, e.g., a threshold that is configurable by an administrator or another user (block 510). For example, cluster merge server 210 may determine whether a cosine similarity of the term vectors is above a threshold cosine similarity. Additionally, or alternatively, cluster merge server 210 may determine a similarity of the term vectors using any other methodology of determining a similarity of term vectors. For example, cluster merge server 210 may determine whether a proportion, e.g., a ratio, a fraction, a percentage, etc., of labels that appear in one term vector appear in the other term vector, and/or vice versa.

If the similarity of the term vectors is above the threshold (block 510—YES), then process 500 may include identifying the candidate clusters as semantically similar (block 515). If, on the other hand, the similarity of the term vectors is not above the threshold (block 510—NO), then process 500 may include identifying the candidate clusters as not semantically similar (block 520).

FIG. 6 illustrates a flowchart of an example process 600 for identifying semantically similar clusters. Process 600, of FIG. 6, may be performed by cluster merge server 210. In another implementation, process 600 may be performed by one or more other components instead of, or possibly in conjunction with, cluster merge server 210. For example, some or all of process 600 may be performed by server 215.

As discussed above, block 415 of process 400 may include a portion of, or the entirety of, process 600. Process 600 may include generating term vectors for labels of each candidate cluster. For example, cluster merge server 210 may generate, for a particular candidate cluster, a term vector that includes each label associated with the candidate cluster. The labels included in the term vector may exclude labels identified as insignificant, e.g., labels identified as insignificant at block 410.

Process 600 may include determining whether the labels of one candidate cluster are a subset of the labels of another candidate cluster (block 605). For example, cluster merge server 210 may determine whether the labels of a first candidate cluster are included in a set of labels associated with a second candidate cluster. Cluster merge server 210 may also determine whether the converse is true, i.e., whether the labels of the second candidate cluster are included in a set of labels associated with the first candidate cluster. In one example, cluster merge server 210 may determine whether all of the labels associated with one candidate cluster are included in the set of labels associated with another candidate cluster. In another example, cluster merge server 210 may determine whether at least a particular portion, e.g., a percentage, a ratio, a fraction, etc., of the labels associated with one candidate cluster are included in the set of labels associated with the other candidate cluster.

If the labels of one candidate cluster are included in a set of labels of the other candidate cluster (block 605—YES), then process 610 may include identifying the candidate clusters as semantically similar. If, on the other hand, the labels of one candidate cluster are not included in a set of labels of the other candidate cluster (block 605—NO), then process 610 may include identifying the candidate clusters as semantically similar.

Example Process for Labeling Merged Cluster

FIG. 7 illustrates a flowchart of an example process 700 for assigning a label to a merged cluster. Process 700 may be performed by cluster merge server 210. In another implementation, process 700 may be performed by one or more other components instead of, or possibly in conjunction with, cluster merge server 210. For example, some or all of process 700 may be performed by server 215.

Process 700 may include identifying a label associated with a first and/or a second component cluster (block 705). The first and second component clusters may be components of a merged cluster, from which the merged cluster was formed. For example, the first component cluster may be the first candidate cluster, and the second component cluster may be the second candidate cluster, as referred to in FIG. 4.

Process 700 may further include identifying a confidence score associated with the label, with respect to the first and second component clusters (blocks 710 and 715). For example, cluster merge server 210 may identify that the label has a first confidence score with respect to the first component cluster, and a second confidence score with respect to the second component cluster. In some examples, when a label is not associated with a particular component cluster, cluster merge server 210 may assign a particular confidence score, e.g., a positive confidence score, a confidence score of 0, or a negative confidence score, to the label, with respect to the particular component cluster. For instance, if a label is identified as associated with the first component cluster, but not to the second component cluster, cluster merge server 210 may assign a confidence score of 0 to the label, with respect to the second component cluster.

Process 700 may further include identifying weights associated with the first and second component clusters (blocks 720 and 725). The weights may be any values that indicate a significance of the component clusters. For instance, cluster merge server 210 may identify a quantity of documents included in each of the first and second component clusters. The weight for a particular component cluster may be based on the quantity of documents in the particular component cluster. For example, a component cluster with 1,000 documents may have a weight of 1,000, while a component cluster with 10,000 documents may have a weight of 10,000.

The weight for a particular component cluster may further be based on other scores assigned to documents in the particular cluster. For example, the weight for a particular component cluster may be further based on a score assigned to each of the documents that is based on a quantity of links/to from the documents, a score assigned to each of the documents that is based on an age of the documents, a score assigned to each of the documents that is based on traffic to/from the documents, etc.

Process 700 may include generating an overall confidence score based on the identified weights and confidence scores (block 730). For example, cluster merge server 210 may generate an overall confidence score for the label, with respect to the merged cluster, based on the identified weights and confidence scores of the component clusters. The overall confidence score for the label, with respect to the merged cluster, may be calculated using equation 1, in which a confidence score of a label, with respect to a cluster C, is referred to as $\text{Conf}_{label}$, the first cluster is referred to as C1, the second cluster is referred to as C2, the merged cluster is referred to as CM, and a weight of a cluster is referred to as $W_{cluster}$:

$$\text{Conf}_{CM} = [(\text{Conf}_{C1})(W_{C1}) + (\text{Conf}_{C2})(W_{C2})] / (W_{C1} + W_{C2}) \quad \text{Equation 1}$$

While a specific example was described above for generating an overall confidence score for a label with respect to a merged cluster, e.g., equation 1, other methodologies may be employed for generating the overall confidence score, such as variations on and/or modifications to equation 1. For instance, in some examples, the weights of one or more of the component clusters may be ignored. In such an implementation, the overall confidence score for the label, with respect to the merged cluster, may be calculated using equation 2, which is an average of the confidence scores:

$$\text{Conf}_{CM} = (\text{Conf}_{C1} + \text{Conf}_{C2}) / 2 \quad \text{Equation 2}$$

Process 700 may further include determining whether the overall confidence score is above a threshold, e.g., a configurable threshold (block 735). If the overall confidence score for the label, with respect to the merged cluster, is above the threshold (block 735—YES), then the label may be assigned to the merged cluster (block 740). If, on the other hand, the overall confidence score for the label, with respect to the merged cluster, is not above the threshold (block 735—NO), then the label may be discarded (block 745). For example, cluster merge server 210 may determine that the label is not to be assigned to the merged cluster.

While process 700 was described as including the above-mentioned blocks 705-745, some or all of these blocks may be considered optional. For example, in one implementation, one or more of blocks 710-725 may be omitted, e.g., confidence scores and/or weights associated with one or more component clusters may not be identified. Additionally, while the example described above with respect to process 700 was described in the context of one label, process 700 may be repeated for multiple, e.g., all, labels associated with one or more component clusters of a merged cluster. Furthermore, multiple iterations of process 700 may be performed in parallel. Furthermore, while the example described above with respect to process 700 was described in the context of two component clusters, process 700 may be applied in situations where a merged cluster includes more than two, such as three, 10, 100, 1,000, etc., clusters.

CONCLUSION

An implementation, described herein, may identify semantically similar clusters, and merge these clusters. Merging the clusters may enable a search engine to more efficiently identify categorically/topically related documents, and enable the search engine to avoid providing duplicative categories/topics to users in response to search queries.

The foregoing description provides illustration and description, but is not intended to be exhaustive or to limit the implementations to the precise form disclosed. Modifications and variations are possible in light of the above teachings or may be acquired from practice of the implementations.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   forming, by one or more devices, a merged cluster of documents based on a first cluster of documents and a second cluster of documents;
   identifying, by the one or more devices, one or more labels that are associated with at least one of the first cluster of documents or the second cluster of documents;
   identifying, by the one or more devices, a first confidence score, associated with a particular label of the one or more labels, with respect to the first cluster of documents;
   identifying, by the one or more devices, a second confidence score, associated with the particular label, with respect to the second cluster of documents;
   determining, by the one or more devices, an overall confidence score based on the first confidence score and the second confidence score; and
   selectively assigning, by the one or more devices, the particular label to the merged cluster based on the overall confidence score.

2. The method of claim 1, further comprising:
   receiving first information regarding the first cluster of documents; and
   receiving second information regarding the second cluster of documents,
      identifying the one or more labels including:
         identifying the one or more labels based on the first information and the second information.

3. The method of claim 1, where the merged cluster of documents includes all documents in the first cluster of documents and all documents in the second cluster of documents.

4. The method of claim 1, further comprising:
   identifying a set of labels that is associated with the first cluster of documents; and
   discarding one or more particular labels from the set of labels,
      identifying the one or more labels including:
         identifying the one or more labels based on the set of labels after discarding the one or more particular labels from the set of labels.

5. The method of claim 4, where discarding the one or more particular labels from the set of labels includes:
   determining that the one or more particular labels are misspelled or that the one or more particular labels are included in a particular list of words, and
   discarding the one or more particular labels based on determining that the one or more particular labels are misspelled or that the one or more particular labels are included in the particular list of words.

6. The method of claim 1, where forming the merged cluster comprises:
   determining that the first cluster of documents and the second cluster of documents are semantically similar; and
   forming the merged cluster based on determining that the first cluster of documents and the second cluster of documents are semantically similar.

7. The method of claim 6,
   where determining that the first cluster of documents and the second cluster of documents are semantically similar comprises:
      determining a first vector for first labels that are associated with the first cluster of documents,
      determining a second vector for second labels that are associated with the second cluster of documents,
      determining a measure of similarity of the first vector and the second vector,
      determining that the measure of similarity satisfies a particular threshold, and
      determining that the first cluster of documents and the second cluster of documents are semantically similar based on determining that the measure of similarity satisfies the particular threshold, and
   where the one or more labels include at least one of a group of the first labels or a group of the second labels.

8. The method of claim 6,
   where the one or more labels include at least one of:
      a group of first labels that are associated with the first cluster of documents, or
      a group of second labels that are associated with the second cluster of documents, and
   where determining that the first cluster of documents and the second cluster of documents are semantically similar comprises:
      determining that the first labels are a subset of the second labels, and
      determining that the first cluster of documents and the second cluster of documents are semantically similar based on determining that the first labels are the subset of the second labels.

9. The method of claim 1, further comprising:
   providing the merged cluster to a cluster repository server after selectively assigning the particular label to the merged cluster, the cluster repository server storing information regarding the merged cluster, and the cluster repository server deleting information regarding the first cluster of documents and the second cluster of documents based on storing the information regarding the merged cluster.

10. A system comprising:
one or more processors to:
identify a label associated with at least one of a first cluster or a second cluster;
identify a first confidence score, associated with the label, with respect to the first cluster;
identify a second confidence score, associated with the label, with respect to the second cluster;
determine an overall confidence score based on the first confidence score and the second confidence score; and
selectively assign the label to a merged cluster based on the overall confidence score,
the merged cluster including at least a group of the first cluster or the second cluster.

11. The system of claim 10, where the one or more processors are further to:
form the merged cluster based on the first cluster and the second cluster.

12. The system of claim 10, where, when identifying the first confidence score, the one or more processors are to:
determine that the label is not associated with the first cluster, and
assign the first confidence score to the label, with respect to the first cluster, based on determining that the label is not associated with the first cluster.

13. The system of claim 10, where, when determining the overall confidence score, the one or more processors are to:
identify a first weight associated with the first cluster,
identify a second weight associated with the second cluster, and
determine an overall confidence score based on the first confidence score, the first weight, the second confidence score, and the second weight.

14. The system of claim 13, where, when identifying the first weight, the one or more processors are to:
determine a quantity of documents in the first cluster, and
identify the first weight based on the quantity of documents.

15. The system of claim 13, where, when identifying the first weight, the one or more processors are to:
determine a particular score based on one of a quantity of links to or from documents in the first cluster, an age of the documents, or traffic to or from the documents, and
identify the first weight based on the particular score.

16. The system of claim 10, where, when determining the overall confidence score, the one or more processors are to:
determine an average of the first confidence score and the second confidence score, and
determine the overall confidence score based on the average.

17. The system of claim 10, where, when selectively assigning the label to the merged cluster, the one or more processors are to:
determine that the overall confidence score satisfies a threshold, and
assign the label to the merged cluster based on determining that the overall confidence score satisfies the threshold.

18. A non-transitory computer-readable medium storing instructions, the instructions comprising:
one or more instructions that, when executed by at least one processor, cause the at least one processor to:
determine a first vector for a first set of labels that are associated with a first cluster of documents;
determine a second vector for a second set of labels that are associated with a second cluster of documents;
determine a measure of similarity of the first vector and the second vector;
determine that the measure of similarity satisfies a particular threshold;
determine that the first cluster of documents and the second cluster of documents are semantically similar based on determining that the measure of similarity satisfies the particular threshold; and
form a merged cluster based on determining that the first cluster of documents and the second cluster of documents are semantically similar.

19. The non-transitory computer-readable medium of claim 18, where the instructions further comprise:
one or more instructions that, when executed by the at least one processor, cause the at least one processor to:
identify one or more particular labels, in the first set of labels, that are misspelled or correspond to words in a particular list of words; and
discard the one or more particular labels from the first set of labels.

20. The non-transitory computer-readable medium of claim 18, where the instructions further comprise:
one or more instructions that, when executed by the at least one processor, cause the at least one processor to:
identify a particular label of the first set of labels and the second set of labels;
determine a confidence score for the particular label; and
selectively assign the particular label to the merged cluster based on the confidence score.

* * * * *